(12) United States Patent
Moore

(10) Patent No.: US 6,260,060 B1
(45) Date of Patent: Jul. 10, 2001

(54) METHOD AND APPARATUS FOR ENHANCING A MESSAGE PREVIEW MODE IN A MESSAGING UNIT

(75) Inventor: Morris Anthony Moore, Southlake, TX (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/192,557

(22) Filed: Nov. 13, 1998

(51) Int. Cl.$^7$ .............................. G06F 15/16; G09G 5/26
(52) U.S. Cl. ............................................ 709/206; 345/128
(58) Field of Search ...................... 340/825.44; 709/206, 709/202; 455/38.4, 556; 345/128; 348/569

(56) References Cited

U.S. PATENT DOCUMENTS

| | | | | |
|---|---|---|---|---|
| 4,766,434 | * | 8/1988 | Matai et al. | 340/825.44 |
| 5,420,973 | * | 5/1995 | Dagdeviren | 707/508 |
| 5,635,978 | * | 6/1997 | Alten et al. | 348/7 |
| 5,703,591 | * | 12/1997 | Tognazzini | 342/30 |
| 5,822,123 | * | 10/1998 | Davis et al. | 348/564 |

\* cited by examiner

Primary Examiner—Larry D. Donaghue
(74) Attorney, Agent, or Firm—R. Louis Breeden

(57) ABSTRACT

A messaging unit (122) receives (702)a message (404) having a header string, and compresses (820) a display of the header string when the messaging unit is operating (802) in a message preview mode.

12 Claims, 4 Drawing Sheets

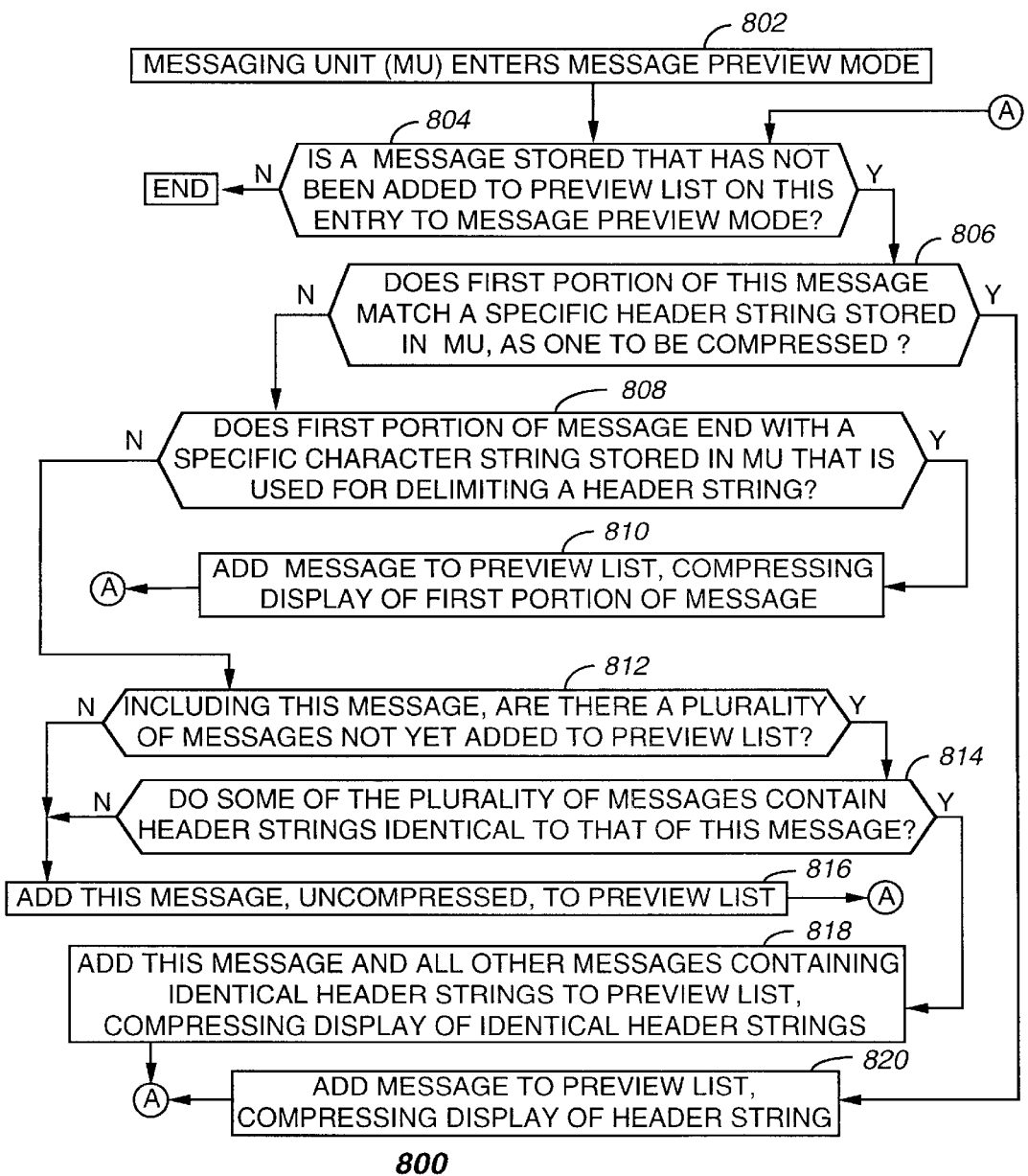

METHOD AND APPARATUS FOR ENHANCING A MESSAGE PREVIEW MODE IN A MESSAGING UNIT

FIELD OF THE INVENTION

This invention relates in general to messaging systems, and more specifically to a method and apparatus for enhancing a message preview mode in a messaging unit.

BACKGROUND OF THE INVENTION

A messaging unit coupled to a messaging system that provides access to a server can deliver various items of information to the messaging unit. For example, one can receive news, sports, weather, and entertainment information by subscribing to appropriate information services. It is a relatively common practice for messaging units to provide a "preview" mode for message viewing in which messages are in a list, with the first portion of each message displayed.

A problem can occur, however, because many types of messages have header strings that can result from routing in an email system, labeling of information services categories, types of query that resulted in the message, and the like. In a messaging unit that has a small display, only a few characters, e.g., 10 to 16 characters, can be displayed per line. The result is that, when messages have header strings longer than can fit onto one line of the display, the message content beyond the header strings cannot be seen in the preview mode. Furthermore, it is possible for the headers to be identical for different messages, thereby rendering it impossible to distinguish one message from another or to learn anything about the real content of the message in the preview mode.

Thus, what is needed is a method and apparatus in a messaging unit, that can enhance the message preview mode to eliminate the problems resulting from header strings.

BRIEF DESCRIPTION OF THE DRAWINGS

FIG. 7 is a flow diagram depicting a prior art operation used in the exemplary messaging unit for receiving and storing a message containing a header string.

FIG. 8 is a flow diagram depicting an operation of the exemplary messaging unit in a message preview mode in accordance with the present invention.

DETAILED DESCRIPTION OF THE DRAWINGS

Figure 1:
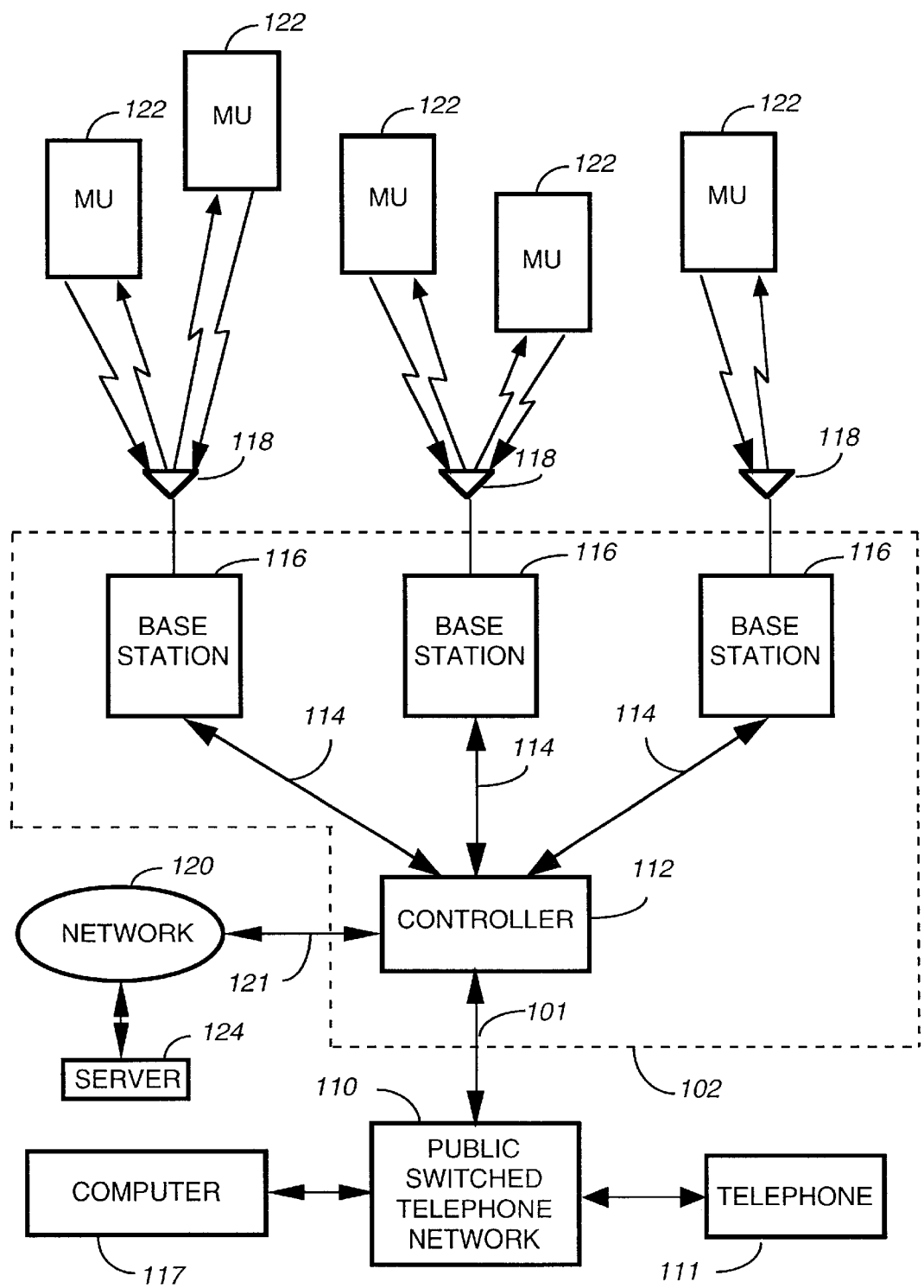
FIG. 1 is an electrical block diagram of an exemplary messaging system in accordance with the present invention.

Referring to FIG. 1, an electrical block diagram depicts an exemplary communication system in accordance with the present invention comprising an infrastructure portion 102 including a controller 112 and a plurality of conventional base stations 116, the communication system also including a plurality of messaging units 122. The base stations 116 preferably communicate with the messaging units 122 utilizing conventional radio frequency (RF) techniques, and are coupled by conventional communication links 114 to the controller 112, which controls the base stations 116.

The controller 112 is preferably a combination of a Choreographer!®network management device, a Wireless Messaging Gateway (WMG ™) Administrator!™ terminal, an RF-Usher!™ multiplexer, and an RF-Conductor!® message distributor manufactured by Motorola, Inc. The base stations 116 are preferably a combination of the RF-Orchestra!™ transmitter and the RF-Audience!® receiver manufactured by Motorola, Inc. The messaging units 122 are preferably similar to PageWriter® 2000 data messaging units, also manufactured by Motorola, Inc., and utilize software modified in accordance with the present invention. It will be appreciated that other similar hardware can be used as well for the controller 112, the base stations 116, and the messaging units 122.

Each of the base stations 116 transmits RF signals to the messaging units 122 via an antenna 118. The base stations 116 preferably each receive RF signals from the plurality of messaging units 122 via the antenna 118. The RF signals transmitted by the base stations 116 to the messaging units 122 (outbound messages) comprise selective call addresses identifying the messaging units 122, and data messages originated by a message originator, as well as commands originated by the controller 112 for adjusting operating parameters of the radio communication system. The RF signals preferably transmitted by the messaging units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. In addition, the controller 112 preferably is coupled through a conventional communication link 121 to a network 120, such as the Internet, for acquiring items of information, e.g., email and data from information services providers, from at least one server 124 also coupled to the network. It will be appreciated that, alternatively, the server 124 can be connected directly to the controller 112 without using the network 120.

The over-the-air protocol utilized for outbound and inbound messages is preferably selected from Motorola's well-known FLEX ™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the embodiment depicted in FIG. I is a two-way wireless messaging system, the present invention also is applicable to a one-way wireless messaging system as well. In addition, the present invention is equally applicable to wired messaging systems. The present invention does not depend upon the messaging system being a wireless system.

Figure 2:
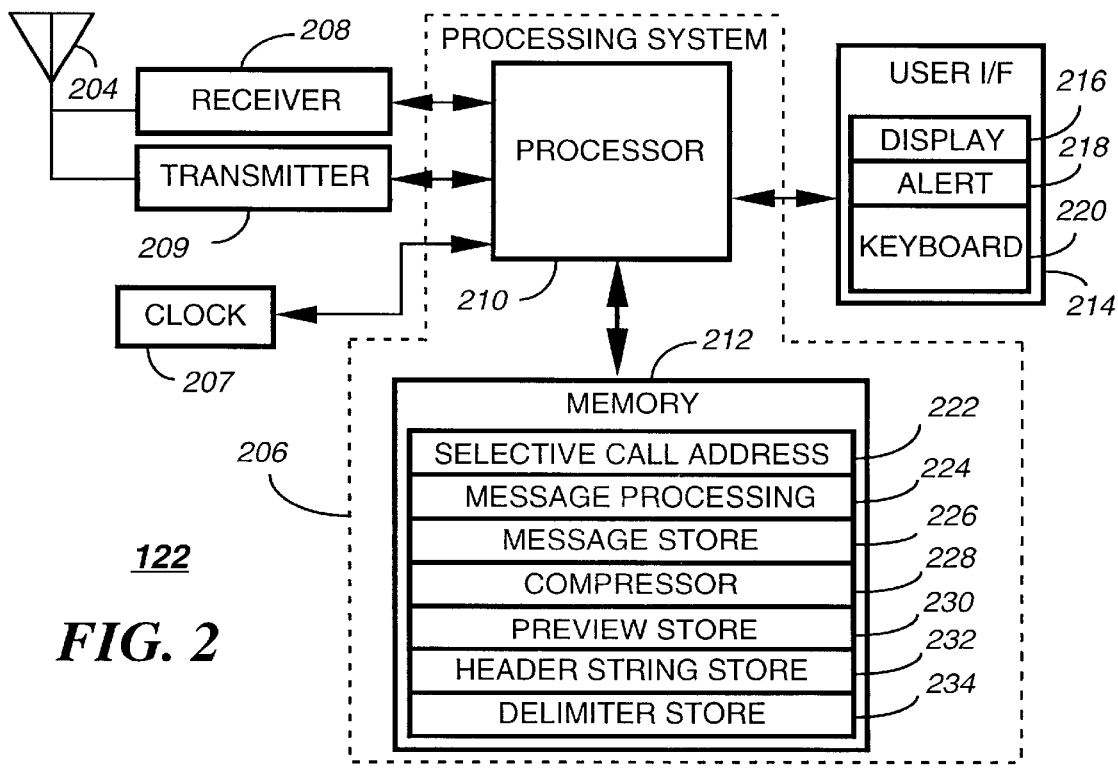
FIG. 2 is an electrical block diagram of an exemplary messaging unit in accordance with the present invention.

FIG. 2 is an electrical block diagram of an exemplary messaging unit 122 in accordance with the present invention. The messaging unit 122 comprises an antenna 204 for intercepting an outbound message and for transmitting an inbound message. The antenna 204 is preferably coupled to a conventional receiver 208 for receiving the outbound message and to a conventional transmitter 209 for transmitting the inbound message. The receiver 208 and the transmitter 209 are coupled to a processing system 206 for processing the outbound and inbound messages and for controlling the messaging unit 122 in accordance with the present invention. A user interface 214 preferably is also coupled to the processing system 206 for interfacing with a user. The user interface 214 comprises a conventional display element 216 for displaying the inbound and outbound messages, a conventional alert element 218 for alerting the user when the outbound message arrives, and a conventional keyboard 220 for generating the inbound message and for controlling the messaging unit 122. A conventional clock 207 is also coupled to the processing system 206 for supporting time keeping requirements of the messaging unit 122. It will be appreciated, when the present invention is applied to a one-way messaging system, that the transmitter 209 can be omitted, and that, in a non-wireless messaging system, the receiver 208 and the transmitter 209 become a wireline interface device, e.g., a modem.

The processing system 206 comprises a conventional processor 210 and a conventional memory 212. The memory 212 comprises software elements and data for programming the processing system 206 in accordance with the present invention. The memory 212 preferably includes a selective call address 222 to which the messaging unit 122 is responsive. In addition, the memory 212 includes a message processing element 224 for programming the processing system 206 to process messages through well-known techniques. The memory 212 further comprises a message store 226 for storing received messages. The memory 212 also includes a compressor element 228 for programming the processing system 206 to compress the display of header strings in the received messages when in a message preview mode. (Note that the term "header string" is defined herein to mean "a first portion of a message, said first portion including one or more characters.") In addition, the memory 212 includes a preview store 230 for storing the messages for display in the preview mode. The memory 212 also includes a header string store 232 for storing specific header strings to be compared with headers of the received messages. The memory 212 further comprises a delimiter store 234 for storing a specific character string used for delimiting a header string. Operation of the messaging unit 122 in accordance with the present invention will be described in detail further below.

Figure 3:
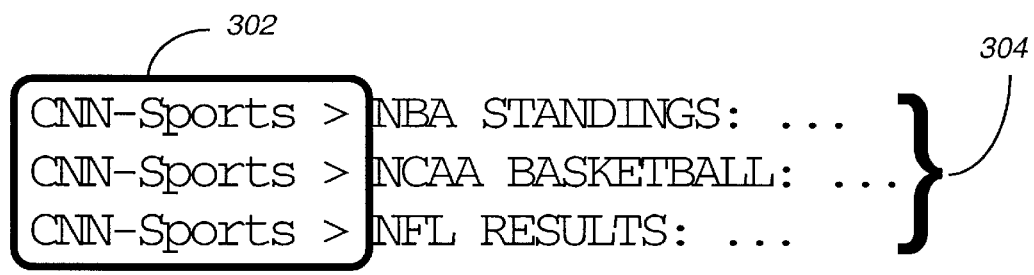
FIG. 3 is a message display diagram depicting viewable and non-viewable portions of messages in a message preview mode of a prior-art messaging unit.

FIG. 3 is a message display diagram 300 depicting viewable and non-viewable portions of messages in a message preview mode of a prior-art messaging unit. The smoothed rectangle 302 represents a display element that can display, for example, twelve characters per line. First portions of three messages 304 are also depicted. Note that in the preview mode, only the header string "CNN-Sports >" is viewable for each of the three messages, rendering the messages indistinguishable from one another.

Figure 4:
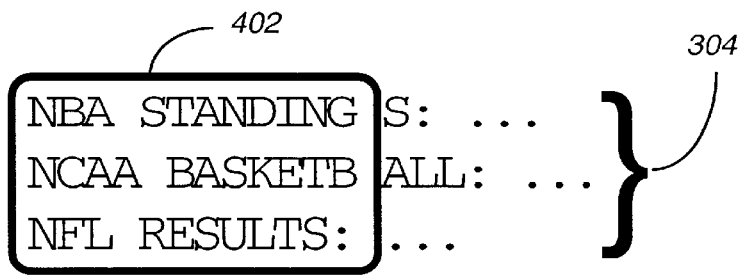
FIG. 4 is a message display diagram depicting viewable and non-viewable portions of messages in a message preview mode of a messaging unit in accordance with a first embodiment of the present invention.

FIG. 4 is a message display diagram 400 depicting viewable and non-viewable portions of messages in a message preview mode of the messaging unit 122 in accordance with a first embodiment of the present invention. In the first embodiment, when in the preview mode, the display of the header string "CNN-Sports >" is suppressed entirely, advantageously allowing the viewable portion (depicted inside the smoothed rectangle 402) to become useful in distinguishing the three messages 304.

Figure 5:
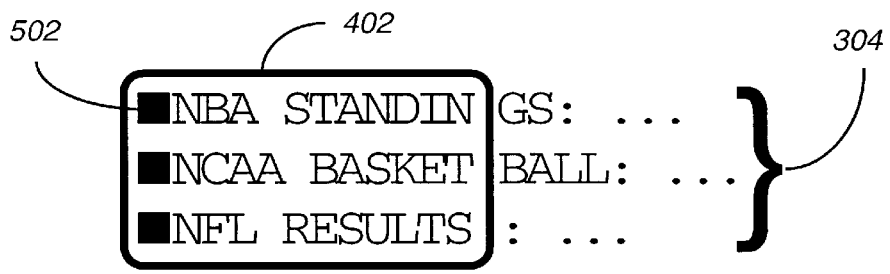
FIG. 5 is a message display diagram depicting viewable and non-viewable portions of messages in a message preview mode of a messaging unit in accordance with a second embodiment of the present invention.

FIG. 5 is a message display diagram 500 depicting viewable and non-viewable portions of messages in a message preview mode of the messaging unit 122 in accordance with a second embodiment of the present invention. In the second embodiment, the processing system 206 has been programmed to replace the header string with at least one predetermined character 502. The at least one predetermined character is useful for reminding the user of the messaging unit 122 that in the preview mode the header string is compressed. If the user wishes to display the header string, he can select the message he wants, and then can display the full message, including the header string, through well-known techniques.

Figure 6:
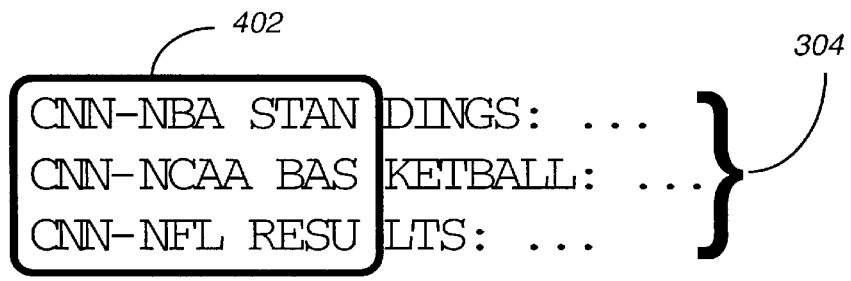
FIG. 6 is a message display diagram depicting viewable and non-viewable portions of messages in a message preview mode of a messaging unit in accordance with a third embodiment of the present invention.

FIG. 6 is a message display diagram 600 depicting viewable and non-viewable portions of messages in a message preview mode of the messaging unit 122 in accordance with a third embodiment of the present invention. In the third embodiment, the processing system 206 is programmed to compress the display of the header string "CNN-Sports >" by shortening the header string to "CNN-". This allows the source of the information to be identified, while still allowing the messages 304 to be distinguished.

FIG. 7 is a flow diagram 700 depicting a prior art operation used in the exemplary messaging unit 122 for receiving and storing a message containing a header string. First, the message with header string is received 702 by the receiver 208 and sent to the processing system 206 through well-known techniques. The processing system 206 then stores 704 the message with header string in the message store 226.

FIG. 8 is a flow diagram 800 depicting an operation of the exemplary messaging unit 122 in a message preview mode in accordance with the present invention. First, the processing system 206 enters 802 the message preview mode. Entry into the message preview mode preferably occurs in response to a control sequence entered through the keyboard 220 by the user of the messaging unit 122. In the message preview mode, the processing system 206 checks 804 whether there is a message stored in the message store 226 that has not been added to a preview list in the preview store 230 on this entry to the message preview mode. If not, the process ends. If so, the processing system 206 checks 806 whether a first portion of this message matches a specific header string stored in the header string store 232 as a header string to be compressed in the message preview mode. If so, the processing system 206 adds 820 the message to the preview list in the preview store 230 and, in doing so, compresses the header string. Flow then returns to step 804 to check for additional messages to add to the preview list.

Compression of the header string can be done in several ways, depending upon the embodiment. In the first embodiment, the display of the header string is suppressed entirely, and the processing system 206 places only the portion of the message following the header string into the preview store 230. In the second embodiment, the processing system 206 replaces the header string with at least one predetermined character. In the third embodiment, the processing system 206 shortens the header string to a predetermined number of characters. It will be appreciated that the first, second, and third embodiments can be incorporated in any combination in the messaging unit 122, and can be selected by the processing system 206 in response to the header string itself, the manner in which the header string is detected, and pre-programmed set-up information stored in the memory 212.

If, on the other hand, at step 806 the first portion of this message does not match a specific header string stored in the header string store 232, then the processing system 206 checks 808 whether a first portion of the message ends with a specific character string stored in the delimiter store 234. (Note that the term "character string" is defined herein to mean "one or more characters.") If so, the processing system 206 adds 810 the message to the preview list, such that the display of the first portion of the message is compressed. Flow then returns to step 804.

If, on the other hand, at step 808 a first portion of the message does not end with a specific character string stored in the delimiter store 234, then the processing system 206 checks 812 whether, including the message currently being evaluated, there are a plurality of messages stored in the message store 226 that have not yet been added to the preview list in the preview store 230. If not, the message currently being evaluated is added 816, uncompressed, to the preview list. Flow then returns to step 804. If, however, at step 812 there are a plurality of messages stored in the message store 226 that have not yet been added to the preview list, then the processing system 206 checks 814 whether some of the plurality of messages contain header strings identical to that of the message currently being evaluated. If not, flow passes again to step 816. If so, the message currently being evaluated, and all other messages containing identical header strings, are added to the preview list, compressing the display of the identical header strings. Flow then returns to step 804.

Thus, it should be clear from the preceding disclosure that the present invention provides a method and apparatus in a messaging unit, that advantageously enhances a message preview mode to eliminate the problems resulting from header strings in prior art messaging units.

Many modifications and variations of the present invention are possible in light of the above teachings. Thus, it is to be understood that, within the scope of the appended claims, the invention can be practiced other than as specifically described herein above.

What is claimed is:

1. A messaging unit for enhancing a message preview mode, comprising:
    a receiver for receiving a message having a header string;
    a processing system coupled to the receiver for processing the message, the processing system comprising a memory; and
    a display element coupled to the processing system for displaying the message,
    wherein the processing system is programmed to
    cooperate with the receiver to receive a plurality of messages having a plurality of header strings;
    store the plurality of messages in the memory;
    check whether at least some of the plurality of header strings are identical to one another; and
    compress a display of the at least some of the plurality of header strings, in response to detecting that the at least some of the plurality of header strings are identical to one another, when operating in the message preview mode.

2. The messaging unit of claim 1, wherein the processing system is further programmed to compress the display of the header string by shortening the header string.

3. The messaging unit of claim 1, wherein the processing system is further programmed to compress the display of the header string by replacing the header string with at least one predetermined character.

4. The messaging unit of claim 1, wherein the processing system is further programmed to compress the display of the header string by suppressing the display of the header string entirely.

5. A messaging unit for enhancing a message preview mode, comprising:
    a receiver for receiving a message having a header string;
    a processing system coupled to the receiver for processing the message, the processing system comprising a memory; and
    a display element coupled to the processing system for displaying the message,
    wherein the processing system is programmed to:
    retain in the memory a specific header string to be compressed when in the message preview mode;
    check whether the specific header string is in the message; and
    compress a display of the specific header string, in response to detecting the specific header string in the message, when operating in the message preview mode.

6. The messaging unit of claim 5, wherein the processing system is further programmed to compress the display of the header string by shortening the header string.

7. The messaging unit of claim 5, wherein the processing system is further programmed to compress the display of the header string by replacing the header string with at least one predetermined character.

8. The messaging unit of claim 5, wherein the processing system is further programmed to compress the display of the header string by suppressing the display of the header string entirely.

9. A messaging unit for enhancing a message preview mode, comprising:
    a receiver for receiving a message having a header string;
    a processing system coupled to the receiver for processing the message, the processing system comprising a memory; and
    a display element coupled to the processing system for displaying the message,
    wherein the processing system is programmed to:
    retain in the memory a specific character string used for delimiting a header string;
    check whether the specific character string ends a first portion of the message; and
    compress a display of the first portion of the message in response to detecting that the specific character string ends the first portion of the message, when operating in the message preview mode.

10. The messaging unit of claim 9, wherein the processing system is further programmed to compress the display of the header string by shortening the header string.

11. The messaging unit of claim 9, wherein the processing system is further programmed to compress the display of the header string by replacing the header string with at least one predetermined character.

12. The messaging unit of claim 9, wherein the processing system is further programmed to compress the display of the header string by suppressing the display of the header string entirely.

* * * * *